United States Patent
Athreya et al.

(10) Patent No.: US 11,780,986 B2
(45) Date of Patent: Oct. 10, 2023

(54) RECYCLED PLASTICS AND METHODS THEREOF

(71) Applicant: Inhance Technologies, LLC, Houston, TX (US)

(72) Inventors: Siddharth Ram Athreya, Houston, TX (US); Subramanian Iyer, Katy, TX (US); Jad Darsey, Nebo, NC (US)

(73) Assignee: Inhance Technologies, LLC, Houston, TX (US)

( * ) Notice: Subject to any disclaimer, the term of this patent is extended or adjusted under 35 U.S.C. 154(b) by 80 days.

(21) Appl. No.: 17/586,861

(22) Filed: Jan. 28, 2022

(65) Prior Publication Data

US 2023/0024065 A1     Jan. 26, 2023

Related U.S. Application Data

(60) Provisional application No. 63/222,542, filed on Jul. 16, 2021.

(51) Int. Cl.
  *C08G 63/183*   (2006.01)
  *C08J 11/16*    (2006.01)

(52) U.S. Cl.
  CPC ............ *C08J 11/16* (2013.01); *C08J 2323/06* (2013.01); *C08J 2323/12* (2013.01)

(58) Field of Classification Search
  USPC ......................................................... 528/120
  See application file for complete search history.

(56) References Cited

U.S. PATENT DOCUMENTS

| | | |
|---|---|---|
| 2,811,468 A | 10/1957 | Joffre |
| 4,869,859 A | 9/1989 | Eschwey |
| 5,770,135 A | 6/1998 | Hobbs et al. |
| 2015/0210047 A1 | 7/2015 | Iyer et al. |
| 2017/0002111 A1 | 1/2017 | Layman et al. |
| 2021/0332207 A1 | 10/2021 | Liu et al. |

OTHER PUBLICATIONS

Aug. 10, 2022 International Search Report issued in Corresponding International Application No. PCT/US22/32842.
Written Opinion of the International Search Report issued in corresponding International Application No. PCT/US22/32842.

*Primary Examiner* — Terressa Boykin
(74) *Attorney, Agent, or Firm* — Clements Bernard Walker; Jennifer R. Knight

(57) ABSTRACT

The present invention provides methods for reducing extractables from plastic articles made from recycled plastic. The method includes the steps of: (a) providing a plastic article in a chamber; and (b) providing a fluorination gas in the chamber, thereby exposing the plastic article to the fluorination gas. The method results in the reduction of the extractables from the plastic article.

20 Claims, No Drawings

RECYCLED PLASTICS AND METHODS THEREOF

CROSS-REFERENCE

This application claims priority under 35 U.S.C. 119(e) to U.S. Provisional Application Ser. No. 63/222,542 filed on Jul. 16, 2021, which is incorporated herein by reference in its entirety.

FIELD OF THE INVENTION

The present invention relates generally to a process for improving plastic articles made with recycled resins. More specifically, the present invention relates to a process for increasing the retention of low molecular weight components from the recycled resins in the plastic article.

BACKGROUND OF THE INVENTION

The use of recycled plastics for various applications and industries has grown significantly over the last decade. There is growing interest in sustainable packaging due to environmental concerns, marketing pressure, and consumer demand. More and more, this interest is linked to the idea of upcycling. In the context of plastic recycling, upcycling means to take the recycled plastic and create a new plastic article of higher quality or value than the original plastic article. However, most of the plastics collected today, if they are turned into new plastic articles, are used to make articles of lower value than the original recycled article. For examples, recycled bottles may be used to make carpet backing, which is a lower value product.

Most plastic collected today is not deemed suitable for upcycling due, in part, to the variability of the incoming plastic stream. The sources of the variability include the mixing of different types of plastics, the degree of degradation associated with reprocessing plastics, and the presence of low molecular weight compounds. The low molecular weight compounds may include degradation products, additives, and residual original package contents (when recycled items are not properly washed). These low molecular weight compounds can manifest as extractables which can affect such things as odor or taste. In some cases, these low molecular weight compounds can extract and leach into the contents of the plastic packaging made with the recycled plastic, and contaminate the product contained therein.

Previous attempts to create recycled packaging solutions with low extractables has been to create a 3 layered structure, wherein the recycled material is sandwiched between virgin materials. The multi-layer structure prevents direct contact of the product in the packaging with the recycled materials. Two significant drawbacks with this solution are 1) the expense of producing multi-layer packaging and 2) the higher environmental impact from the use of virgin materials. There is a need in the market to develop technologies and solutions that can upgrade the recycled plastic stream to enable additional applications and uses of recycled materials that do not require multi-layer structures.

There is a need to produce improved plastic articles from recycled plastic with significantly reduced amounts of extractable components. There is a need to produce these improved plastic articles without impacting mechanical properties. There is a need to produce these improved plastic articles in a cost-effective manner. There is a need to produce these improved plastic articles in such a way that the improved plastic articles are recyclable. Finally, there is a need to produce these improved plastic articles in a large variety of shape and size to meet the needs of the packaging industry.

BRIEF SUMMARY OF THE INVENTION

According to an embodiment of the present invention, a method of improving the quality of products made with recycled plastics is provided. The method comprises the steps of (a) providing a plastic article in a chamber, (b) providing a fluorination gas in the chamber, thereby exposing the plastic article to the fluorination gas to produce a treated plastic article, (c) withdrawing the fluorination gas from the chamber, and (d) withdrawing the treated plastic article from the chamber. The plastic article comprises at least 50 wt. % polyolefin. The plastic article also comprises at least 10 wt. % recycled resin. Step (b) occurs for a time period ranging from 5 minutes to 600 minutes, at a chamber temperature ranging from 10° C. to 150° C., and a chamber pressure ranging from 5 mmHg to 1520 mmHg. The treated plastic article and the plastic article comprise extractable components. The extractable components comprise volatile extractives, non-volatile extractives, metal extractives and/or, leachables. An amount of volatile extractives from a first treated sample is reduced by at least 10% compared to an amount of volatile extractives from a first untreated sample. An amount of non-volatile extractives from a second treated sample is reduced by at least 10% compared to an amount of non-volatile extractives from a second untreated sample. An amount of metal extractives from a third treated sample is reduced by at least 10% compared to an amount of metal extractives from a third untreated sample.

According to another embodiment of the present invention, a method of improving the quality of bottles made with recycled plastics is provided. The method comprises the steps of (a) providing a plastic bottle in a chamber, (b) providing a fluorination gas in the chamber, thereby exposing the plastic bottle to the fluorination gas to produce a treated plastic bottle, (c) withdrawing the fluorination gas from the chamber, and (d) withdrawing the treated plastic bottle from the chamber. The plastic bottle comprises at least 50 wt. % polyolefin. The plastic bottle comprises at least 10 wt. % recycled resin. Step (b) occurs for a time period ranging from 5 minutes to 300 minutes, at a chamber temperature ranging from 10° C. to 150° C., and a chamber pressure ranging from 5 mmHg to 1520 mmHg. The treated plastic bottle and the plastic bottle comprise extractable components. The extractable components comprise volatile extractives, non-volatile extractives, metal extractives and/or, leachables. An amount of volatile extractives from a first treated sample is reduced by at least 10%, compared to an amount of volatile extractives from a first untreated sample An amount of non-volatile extractives from a second treated sample is reduced by at least 10%, compared to an amount of non-volatile extractives from a second untreated sample. An amount of metal extractives from a third treated sample is reduced by at least 10% compared to an amount of metal extractives from a third untreated sample.

According to yet another embodiment of the present invention, an improved plastic bottle is obtained by the method of the present invention. The treated plastic bottle is obtained by the method comprising steps of (a) providing a plastic bottle in a chamber, (b) providing a fluorination gas in the chamber, thereby exposing the plastic bottle to the fluorination gas to produce a treated plastic bottle, (c) withdrawing the fluorination gas from the chamber, and (d) withdrawing the treated plastic bottle from the chamber. The plastic bottle comprises at least 50 wt. % polyolefin. The plastic bottle also comprises at least 10 wt. % recycled resin. Step (b) occurs for a time period ranging from 5 minutes to 300 minutes, at a chamber temperature ranging from 10° C. to 150° C., and a chamber pressure ranging from 5 mmHg to 1520 mmHg. The extractable components comprise volatile extractives, non-volatile extractives, metal extractives and/or, leachables. An amount of volatile extractives from a first treated sample is reduced by at least 10% compared to an amount of volatile extractives from a first untreated sample. An amount of non-volatile extractives from a second treated sample is reduced by at least 10% compared to an amount of non-volatile extractives from a second untreated sample. An amount of metal extractives from a third treated sample is reduced by at least 10% compared to an amount of metal extractives from a third untreated sample.

DETAILED DESCRIPTION OF THE INVENTION

The present invention provides a method of improving the quality of products made with recycled plastics. The method comprises the steps of (a) providing a plastic article in a chamber, (b) providing a fluorination gas in the chamber, thereby exposing the plastic article to the fluorination gas to produce a treated plastic article, (c) withdrawing the fluorination gas from the chamber, and (d) withdrawing the treated plastic article from the chamber. The plastic article comprises at least 50 wt. % polyolefin. The plastic article comprises at least 10 wt. % recycled resin. Step (b) occurs for a time period ranging from 5 minutes to 600 minutes, at a chamber temperature ranging from 10° C. to 150° C., and a chamber pressure ranging from 5 mmHg to 1520 mmHg. The treated plastic article and the plastic article comprise extractable components. The extractable components comprise volatile extractives, non-volatile extractives, metal extractives and/or, leachables. An amount of volatile extractives from a first treated sample is reduced by at least 10% compared to an amount of volatile extractives from a first untreated sample. An amount of non-volatile extractives from a second treated sample is reduced by at least 10% compared to an amount of non-volatile extractives from a second untreated sample. An amount of metal extractives from a third treated sample is reduced by at least 10% compared to an amount of metal extractives from a third untreated sample.

The present invention may be understood more readily by reference to the following detailed description of the invention. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

It is to be understood that the mention of one or more method steps does not preclude the presence of additional method steps before or after the combined recited steps or intervening method steps between those steps expressly identified. Moreover, the lettering of method steps or ingredients is a conventional means for identifying discrete activities or ingredients and the recited lettering can be arranged in any sequence, unless otherwise indicated. Method steps that begin with the word "optionally" may occur, but are not required to occur.

As used herein, the term "and/or", when used in a list of two or more items, means that any one of the listed items can be employed by itself, or any combination or two or more of the listed items can be employed. For example, if a composition is described as containing compounds A, B, "and/or" C, the composition may contain A alone; B alone; C alone; A and B in combination; A and C in combination; B and C in combination; or A, B, and C in combination.

As used herein, the term "plastic article", refers to any useful item made primarily of one or more polymers.

As used herein, the term "chamber", refers to at least one piece of process equipment capable of enclosing the plastic article and the fluorination gas and excluding atmospheric gases at the process conditions.

As used herein, the term "fluorination gas", refers to a gas comprising fluorine, chlorine trifluoride, and/or nitrogen trifluoride. The "fluorination gas" may also contain inert elements and/or compounds.

As used herein, the term "polyolefin", refers to a polymer produced from at least one olefin. Common polyolefins include, but are not limited to, polyethylene, polypropylene, and copolymers of ethylene and propylene.

As used herein, the term "recycled resin", refers to material that has been recovered from a plastic article and is usable for making future plastic articles. "Recycled resin" broadly includes both "post-industrial recycled (PIR) resin and "post-consumer recycled (PCR) resin". As used herein the term "post-industrial recycled (PIR) resin", refers to material recovered from within an industrial setting, e.g., defective articles, scrap, etc. As used herein, the term "post-consumer recycled (PCR) resin", refers to the recycled material from consumer plastic waste. "PCR resin" from plastic packaging has been exposed to the content that was contained in the plastic packaging. In contrast, as used herein, the term "virgin resin" refers to a polymer, such as a polyolefin, that has been produced from its monomers and has not yet been formed into a plastic article.

As used herein, "untreated sample", refers to at least a portion of a prototypical plastic article to which analytical testing is applied; the analytical testing takes place on a sample from a plastic article that has not been subject to the method of the present invention. As used herein, the term "treated sample", refers to at least a portion of a prototypical treated plastic article to which analytical testing is applied; the analytical testing takes place on a sample from a treated plastic article that has been subject to the method of the present invention. As the plastic articles can be of varied size, standardized testing can be obtained by applying analytical techniques to standard-sized samples from a prototypical plastic article and a prototypical treated plastic article. Typically, the "untreated sample" and the "treated sample" will be substantially the same size to facilitate direct comparison of extraction results.

As used herein, the term "extractable components", refers to the extractable components which can be obtained from a plastic article, or a sample thereof. The extractable components can be in a solvent or can be in the headspace above a plastic article.

As used herein, the term "rigid article", refers to any plastic article that is classified under the Rigid Packaging Market. Examples of "rigid articles" include, but are not limited to, bottles, caps, pails, lids, trays, drums, vials, cartridges, intermediate bulk containers (IBC) and tanks. Common molding processes to produce "rigid articles" include, but are not limited to, blow molding, injection molding, compression molding, thermoforming, and roto-molding.

As used herein, the term "semi-rigid article", refers to plastic articles that have a degree of flexibility, but can retain their shape. Examples of "semi-rigid articles" include, but are not limited to, stand-up pouches and tubes (such as for toothpaste).

As used herein, the term "plastic container", refers to a plastic receptacle or enclosure for retaining a liquid, solid or gas. The size is not particularly limited as long as the "plastic container" can fit inside the chamber. Non-limiting examples of uses for plastic containers include cosmetic packaging, household cleaning packaging, industrial solvent packaging, and fuel tanks.

As used herein, the term "smaller analog of the plastic container", refers to a second plastic container that is made by the same process and of the same material as the plastic container and simply differs from the plastic container in that it is smaller. As used herein, the term "treated smaller analog of the plastic container", refers to a second plastic container that is made by the same process and of the same material as the plastic container and simply differs from the plastic container in that it is smaller and that it has been subject to the method of the present invention.

The plastic article comprises a polyolefin. The molecular weight of, the amount of branching of, and the particular olefins included in the polyolefin are not particularly limited as long as they are suitable for the plastic article. In some aspects, the polyolefin comprises polyethylene, polypropylene, and/or copolymers thereof. In some aspects, the polyolefin comprises high-density high-molecular-weight polyethylene, high-density polyethylene (HDPE), linear-low-density polyethylene (LLDPE), low-density polyethylene (LDPE) and/or polypropylene. In some aspects, the polyolefin comprises high density polyethylene (HDPE), low density polyethylene (LDPE) and/or polypropylene. In some aspects the polyolefin comprises high-density polyethylene (HDPE) and/or low-density polyethylene (LDPE). In some aspects, at least part of the polyolefin is virgin polyolefin. In some aspects, at least part of the polyolefin is recycled polyolefin. The amount of polyolefin contained in the plastic article includes both any virgin polyolefin and any recycled polyolefin.

The plastic article comprises a recycled resin. In some aspects, the plastic article comprises the recycled resin in an amount of at least 5 wt. %, or least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. %, or at least 99 wt. %, or at least 100 wt. %. In some aspects, the plastic article comprises recycled resin in an amount ranging from 10 wt. % to 100 wt. %; 10 wt. % to 98 wt. %; or 10 wt. % to 90 wt. %; or 10 wt. % to 80 wt. %;%; or 10 wt. % to 50 wt. %; or 30 wt. % to 100 wt. %; or 30 wt. % to 98 wt. %; or 30 wt. % to 80 wt. %; or 30 wt. % to 50 wt. %; or 50 wt. % to 100 wt. %; or 50 wt. % to 98 wt. %; or 50 wt. % to 90 wt. %; or 50 wt. % to 80 wt. %; or 70 wt. % to 100 wt. %; or 70 wt. % to 98 wt. %; or 70 wt. % to 90 wt. %.

In some aspects, the recycled resin comprises polyethylene, polypropylene, and/or copolymers thereof. In some aspects, the recycled resin comprises high-density high-molecular-weight polyethylene, high-density polyethylene (HDPE), linear-low-density polyethylene (LLDPE), low-density polyethylene (LDPE) and/or polypropylene. In some aspects, the recycle resin comprises high density polyethylene (HDPE), low density polyethylene (LDPE) and/or polypropylene. In some aspects the recycled resin comprises high-density polyethylene (HDPE) and/or low-density polyethylene (LDPE). In some aspects, the recycled resin comprises at least at least 40 wt. % polyolefin, or at least 50 wt. % polyolefin, or at least 60 wt. % polyolefin, or at least 70 wt. % polyolefin, or at least 80 wt. % polyolefin or at least 90 wt. % polyolefin, or at least 95 wt. % polyolefin, or at least 98 wt. % polyolefin. In some aspects, the recycled resin comprises at least 10 wt. % polyethylene, or at least 20 wt. % polyethylene, or at least 30 wt. % polyethylene, or at least 40 wt. % polyethylene, or at least 50 wt. % polyethylene, or at least 60 wt. % polyethylene, or at least 70 wt. % polyethylene, or at least 80 wt. % polyethylene or at least 90 wt. % polyethylene, or at least 95 wt. % polyethylene, or at least 98 wt. % polyethylene.

The treated plastic article and the plastic article comprise extractable components. The extractable components comprise volatile extractives, non-volatile extractives, metal extractives and/or, leachables. The amount of volatile extractives from a first treated sample is reduced by at least 10% compared to the amount of volatile extractives from a first untreated sample. In some aspects, the amount of volatile extractives is reduced by at least 20%, or by at least 30%, or by at least 35%, or by at least 40%, or by at least 50%, or by at least 60%, or by at least 70% or by at least 80%. The amount of non-volatile extractives from a second treated sample is reduced by at least 10% compared to the amount of non-volatile extractives from a second untreated sample. In some aspects, the amount of non-volatile extractives is reduced by at least 20%, or by at least 30%, or by at least 35%, or by at least 40%, or by at least 50%, or by at least 60%, or by at least 70% or by at least 80%. The amount of metal extractives from a third treated sample is reduced by at least 10% compared to the amount of metal extractives from a third untreated sample. In some aspects, the amount of metal extractives is reduced by at least 20%, or by at least 30%, or by at least 35%, or by at least 40%, or by at least 50%, or by at least 60%, or by at least 70% or by at least 80%.

In some aspects the plastic article is a rigid article or a semi-rigid article. In some aspects, the plastic article is a rigid article selected from the group consisting of bottles, caps, pails, lids, trays, drums, vials, cartridges, intermediate bulk containers (IBC), and tanks. In some aspects, the plastic article is a semi-rigid article selected from the group consisting of stand-up pouches (SUP) and tubes. In some aspects, the plastic article is selected from the group consisting of bottles, caps, pails, lids, trays, drums, vials, cartridges, intermediate bulk containers (IBC), tanks stand-up pouches (SUP) and tubes.

In some aspects, the plastic article is of a mono-layered construction. By necessity, the single layer will comprise the recycled resin of the plastic article. In some aspects, the plastic article is of a multi-layered construction. In some aspects, the amount of recycled resin is different in one or more of the layers. In some aspects, one or more of the layers comprises comprise the recycled resin in an amount of least 5 wt. %, or least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. % or at least 99 wt. % or at least 100 wt. %.

In some aspects, during step (b) the time period ranges from 5 minutes to 300 minutes, the chamber temperature ranges from 10° C. to 100° C., and the chamber pressure ranges from 50 mmHg to 760 mmHg.

The present embodiment includes providing a fluorination gas in the chamber. In some aspects, the fluorination gas comprises fluorine in range of 1-100% by volume (e.g., the fluorination gas being pure fluorine, the fluorination gas being a gas mixture including fluorine mixed with at least one additional gas such as nitrogen, carbon dioxide, and/or argon). In some aspects, the fluorination gas comprises 5 vol % to 95 vol % fluorine, 10 vol % to 90 vol % fluorine, or 20 vol % to 75 vol % fluorine. In some aspects, the fluorination gas comprises 99 vol % to 0 vol % of an inert gas. Other non-limiting examples include 95 vol % to 5 vol %; 90 vol % to 10 vol %; and 80 vol % to 25 vol % of inert gas. In some aspects, the fluorination gas comprises fluorine, chlorine trifluoride, and/or nitrogen trifluoride, and the fluorination gas comprises 5 vol % to 95 vol % fluorine equivalents, 10 vol % to 90 vol % fluorine equivalents, or 20 vol % to 75 vol % fluorine equivalents. In some aspects, the fluorination gas comprises 99 vol % to 0 vol % of an inert gas, and the inert gas comprises nitrogen. In some aspects all of fluorination gas is fed to the chamber at the start of step (b). In some aspects, the fluorination gas is fed over at least part of the time period of step (b).

The method includes the step (c) withdrawing the fluorination gas from the chamber. The method for withdrawing the fluorination gas from the chamber is not particularly limited. In some aspects the fluorination gas is removed from the chamber by applying vacuum to the chamber to pull the fluorination gas out of the chamber. In some aspects, the fluorination gas is displaced in the chamber by feeding a different gas into the chamber while simultaneously allowing gas from within the chamber to exit the chamber.

A major barrier to using significant amounts of recycled resin in packaging, and food packaging in particular, is the amount and variability of extractable components introduced with the recycled resin. Without being bound by any theory, it is believed that fluorine and polyolefin react at the plastic article surface to form a thin barrier layer, making it difficult for the extractable components to migrate from the plastic article.

In some aspects, extractable components comprise terpenoids, fatty acids, fatty esters, fatty alcohols, saturated and unsaturated hydrocarbons, mineral oil hydrocarbons (MOH), benzene and functionalized derivatives, and/or oxygenated hydrocarbons such as aldehydes, ketones, and/or alcohols.

In some aspects, an amount of the volatile extractives from a first treated sample is reduced by at least 35% compared to an amount of the volatile extractives from a first untreated sample as determined by 2-dimensional Headspace GC-MS after the treated sample and the untreated sample have been subject to desorption conditions of 80° C. for 20 minutes. In some aspects, the amount of the volatile extractives from a first treated sample is reduced by at least 40% or at least 50% or at least 60% or at least 70%, or at least 80% compared to an amount of the volatile extractives from a first untreated sample. When the first treated sample is a plastic container, the container can be hermetically sealed, the sealed container can be subjected to desorption conditions of 80° C. for 20 minutes, and the vapor from inside the container can be analyzed for volatile extractives.

A useful test for the amount of extractables from a plastic container with recycled material is a migration methodology, wherein a solvent is sealed in the plastic container for a given period of time at a given temperature, and the amount of extractable components in the solvent is measured. The results can be normalized by several variables, such as, the contact area between the solvent and the plastic container.

In some aspects, the plastic article is a plastic container, and the treated plastic article is a treated plastic container. The second treated sample is one of the treated plastic container or a treated smaller analog of the plastic container and the second untreated sample is one of the plastic container or a smaller analog of the plastic container. A first portion of a solvent fills at least 90 vol % of the second treated sample and a substantially equal amount of a second portion of the solvent fills at least 90 vol % of the second untreated sample. The filled second treated sample and the filled second untreated sample are each closed and stored for 24 hours at 60° C., whereby the first portion of the solvent comprises the extractable components from the second treated sample and the second portion of the solvent comprises the extractable components from the second untreated sample, The first portion of the solvent and the second portion of the solvent are analyzed by GC. The extractable components comprise non-volatile extractives and the non-volatile extractives comprise and/or are converted to n-alkane equivalents. An amount of n-alkane equivalents in the first portion of the solvent per decimeter squared of contact area between the first portion of the solvent and the second treated sample (mg/dm$^2$) is reduced by at least 35% compared to an amount of n-alkane equivalents in the second portion of the solvent per decimeter squared of contact area between the second portion of the solvent and the second untreated sample (mg/dm$^2$). In some aspects, the amount of n-alkane equivalents from the second treated sample is reduced by at least 25%, 40%, 50%, 60%, 70%, 80%, or 90% compared to the amount of n-alkane equivalents from the second untreated sample. In some aspects, the solvent is selected from the group consisting of water, acetic acid, hexane, heptane, octane, toluene, methanol, ethanol, and/or xylene. In some aspects, the solvent is selected from the group consisting of hexane, heptane, octane, toluene, methanol, ethanol, and/or xylene. In some aspects, solvent is selected from the group consisting of hexane, heptane, octane, toluene, and/or xylene. In some aspects, the solvent is selected from the group consisting of hexane, heptane, and/or octane. In some aspects, the solvent consists essentially of octane.

In some aspects, the solvent consists essentially of hexane. In some aspects, the second treated sample is stored in the solvent at room temperature for 2 hours whereby the solvent comprises the extractable components from the second treated sample. The extractable components comprise non-volatile extractives and the non-volatile extractives comprise mineral oil saturated hydrocarbons (MOSH). After the 2 hours, the solvent is analyzed for MOSH using online coupled LC-GC-FID. The solvent comprises less than 10 mg/kg-second-treated-sample MOSH.

In some aspects, the extractable components comprise metal extractives. In some aspects, the metal extractives are selected from the group consisting of copper, zinc, aluminum, and/or lead. In some aspects, the third treated sample and the third untreated sample are analyzed according to standard, EN 71-3:2019 Soluble Heavy Metals, using inductively coupled plasma optical emission spectroscopy (ICP-OES). In some aspects, the amount of the metal extractives in the third treated sample is reduced by at least 35 wt. % compared to the amount of the metal extractives from the third untreated sample. In some aspects, the amount of the metal extractives in the third treated sample is reduced by at least 20 wt. %, or by at least 30 wt. %, at least 40 wt. %, or by at least 45 wt. % compared to a total amount of the metal extractives in the third untreated sample.

Another embodiment of the present invention provides a method of improving the quality of plastic bottles made with recycled plastics. The method comprises the steps of (a) providing a plastic bottle in a chamber, (b) providing a fluorination gas in the chamber, thereby exposing the plastic bottle to the fluorination gas to produce a treated plastic bottle, (c) withdrawing the fluorination gas from the chamber, and (d) withdrawing the treated plastic bottle from the chamber. The plastic bottle comprises at least 50 wt. % polyolefin. The plastic bottle comprises at least 10 wt. % recycled resin. Step (b) occurs for a time period ranging from 5 minutes to 300 minutes, at a chamber temperature ranging from 10° C. to 150° C., and a chamber pressure ranging from 5 mmHg to 1520 mmHg. The treated plastic bottle and the plastic bottle comprise extractable components. The extractable components comprise volatile extractives, non-volatile extractives, metal extractives and/or, leachables. An amount of volatile extractives from a first treated sample is reduced by at least 10%, compared to an amount of volatile extractives from a first untreated sample An amount of non-volatile extractives from a second treated sample is reduced by at least 10%, compared to an amount of non-volatile extractives from a second untreated sample. An amount of metal extractives from a third treated sample is reduced by at least 10% compared to an amount of metal extractives from a third untreated sample.

It is to be understood that the various aspects of the amount of reduction in the volatile extractives, non-volatile extractives, and metal extractives; the step (b) process conditions of time period, chamber temperature, and chamber pressure; the types of recycled resin; the amounts of recycled resin; the monolayered and multilayered construction; and the fluorination gas described herein above apply to the present embodiment as well.

In some aspects, the polyethylene comprises high-density high-molecular-weight polyethylene, high-density polyethylene (HDPE), linear-low-density polyethylene (LLDPE), and/or low-density polyethylene (LDPE). In some aspects, the polyethylene comprises high density polyethylene (HDPE), low density polyethylene (LDPE). The amount of polyethylene contained in the plastic bottle includes both any virgin polyethylene and any recycled polyethylene.

In some aspects, the recycle resin comprises high density polyethylene (HDPE) and/or low-density polyethylene (LDPE). In some aspects, the recycled resin comprises at least 10 wt. % polyethylene, or at least 20 wt. % polyethylene, or at least 30 wt. % polyethylene, or at least 40 wt. % polyethylene, or at least 50 wt. % polyethylene, or at least 60 wt. % polyethylene, or at least 70 wt. % polyethylene, or at least 80 wt. % polyethylene or at least 90 wt. % polyethylene, or at least 95 wt. % polyethylene, or at least 98 wt. % polyethylene.

The treated plastic bottle and the plastic bottle comprise extractable components. The extractable components comprise volatile extractives, non-volatile extractives, metal extractives and/or, leachables. The amount of volatile extractives from a first treated sample is reduced by at least 10% compared to the amount of volatile extractives from a first untreated sample. In some aspects, the amount of volatile extractives is reduced by at least 20%, or by at least 30%, or by at least 35%, or by at least 40%, or by at least 50%, or by at least 60%, or by at least 70% or by at least 80%. The amount of non-volatile extractives from a second treated sample is reduced by at least 10% compared to the amount of non-volatile extractives from a second untreated sample. In some aspects, the amount of non-volatile extractives is reduced by at least 20%, or by at least 30%, or by at least 35%, or by at least 40%, or by at least 50%, or by at least 60%, or by at least 70% or by at least 80%. The amount of metal extractives from a third treated sample is reduced by at least 10% compared to the amount of metal extractives from a third untreated sample. In some aspects, the amount of metal extractives is reduced by at least 20%, or by at least 30%, or by at least 35%, or by at least 40%, or by at least 50%, or by at least 60%, or by at least 70% or by at least 80%.

In some aspects, the plastic bottle is of a mono-layered construction. By necessity, the single layer will comprise the recycled resin of the plastic bottle. In some aspects, the plastic bottle is of a multi-layered construction. In some aspects, the amount of recycled resin is different in one or more of the layers. In some aspects, one or more of the layers comprises comprise the recycled resin in an amount of least 5 wt. %, or least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. %, or at least 99 wt. % or at least 100 wt. %.

In some aspects, the first treated sample is one of the treated plastic bottles or a treated smaller analog of the plastic bottle, and first untreated sample is a plastic bottle or a smaller analog of the plastic bottle. The amount of the volatile extractives from a first treated sample is reduced by at least 35% compared to an amount of the volatile extractives from a first untreated sample as determined by 2-dimensional Headspace GC-MS after the treated sample and the untreated sample have been subject to desorption conditions of 80° C. for 20 minutes. In some aspects, the amount of the volatile extractives from a first treated sample is reduced by at least 40% or at least 50% or at least 60% or at least 70%, or at least 80% compared to an amount of the volatile extractives from a first untreated sample. In some aspects, the first treated sample and the first untreated sample are hermetically sealed, the sealed bottles are subjected to desorption conditions of 80° C. for 20 minutes, and the vapor from inside the bottles is analyzed for the volatile extractants.

In some aspects, the second treated sample is one of the treated plastic bottles or a treated smaller analog of the plastic bottle and the second untreated sample is one of the plastic bottles or a smaller analog of the plastic bottle. A first portion of a solvent fills at least 90 vol % of the second treated sample and a substantially equal amount of a second portion of the solvent fills at least 90 vol % of the second untreated sample. The filled second treated sample and the filled second untreated sample are each closed and stored for 24 hours at 60° C., whereby the first portion of the solvent comprises the extractable components from the second treated sample and the second portion of the solvent comprises the extractable components from the second untreated sample, The first portion of the solvent and the second portion of the solvent are analyzed by GC. The extractable components comprise non-volatile extractives and the non-volatile extractives comprise and/or are converted to n-alkane equivalents. An amount of n-alkane equivalents in the first portion of the solvent per decimeter squared of contact area between the first portion of the solvent and the second treated sample (mg/dm$^2$) is reduced by at least 40% compared to an amount of n-alkane equivalents in the second portion of the solvent per decimeter squared of contact area between the second portion of the solvent and the second untreated sample (mg/dm$^2$). In some aspects, the amount of extractables from the second treated sample is reduced by at least 35%, 40%, 50%, 60%, 70%, 80%, or 90% compared to the amount of extractables from the second untreated sample. In some aspects, the solvent is selected from the group consisting of water, acetic acid, hexane, heptane, octane, toluene, methanol, ethanol, and/or xylene. In some aspects, the solvent is selected from the group consisting of hexane, heptane, octane, toluene, methanol, ethanol, and/or xylene. In some aspects, solvent is selected from the group consisting of hexane, heptane, octane, toluene, and/or xylene. In some aspects, the solvent is selected from the group consisting of hexane, heptane, and/or octane. In some aspects, the solvent consists essentially of octane.

In some aspects, the second treated sample is stored in a solvent at room temperature for 2 hours whereby the solvent comprises the extractable components from the treated sample. The extractable components comprise non-volatile extractives and the non-volatile extractives comprise mineral oil saturated hydrocarbons (MOSH). After the 2 hours, the solvent is then analyzed for MOSH using online coupled LC-GC-FID. The solvent comprises less than 10 mg/kg-second-treated-sample MOSH.

Yet another embodiment of the present invention provides an improved plastic bottle obtained by the method of the present invention. The treated plastic bottle is obtained by the method comprising steps of (a) providing a plastic bottle in a chamber, (b) providing a fluorination gas in the chamber thereby exposing the plastic bottle to the fluorination gas to produce a treated plastic bottle, (c) withdrawing the fluorination gas from the chamber, and (d) withdrawing the treated plastic bottle from the chamber. The plastic bottle comprises at least 50 wt. % polyolefin. The plastic bottle also comprises at least 10 wt. % recycled resin. Step (b) occurs for a time period ranging from 5 minutes to 300 minutes, at a chamber temperature ranging from 10° C. to 150° C., and a chamber pressure ranging from 5 mmHg to 1520 mmHg. The treated plastic bottle and the plastic bottle comprise extractable components. The extractable components comprise volatile extractives, non-volatile extractives, metal extractives and/or, leachables. An amount of volatile extractives from a first treated sample is reduced by at least 10% compared to an amount of volatile extractives from a first untreated sample. An amount of non-volatile extractives from a second treated sample is reduced by at least 10% compared to an amount of non-volatile extractives from a second untreated sample. An amount of metal extractives from a third treated sample is reduced by at least 10% compared to an amount of metal extractives from a third untreated sample.

It is to be understood that the various aspects of the amount of reduction in the volatile extractives, non-volatile extractives, and metal extractives; the step (b) process conditions of time period, chamber temperature, and chamber pressure; the types of recycled resin; the amounts of recycled resin; the monolayered and multilayered construction; and the fluorination gas described herein above apply to the present embodiment as well.

A non-limiting listing of embodiments follows.

A1. A method of improving the quality of products made with recycled plastics, the method comprising the steps of:
(a) providing a plastic article in a chamber; and
(b) providing a fluorination gas in the chamber, thereby exposing the plastic article to the fluorination gas to produce a treated plastic article;
(c) withdrawing the fluorination gas from the chamber; and
(d) withdrawing the treated plastic article from the chamber,
wherein the plastic article comprises at least 50 wt. %, or at least 60 wt. %, or at least 70 wt. %, or at least 80 wt. %, or at least 90 wt. % polyolefin,
wherein the plastic article comprises at least 10 wt. %, or at least 20 wt. % or at least 30 wt. %, or at least 40 wt. %, or at least 50 wt. % recycled resin,
wherein step (b) occurs for a time period ranging from 5 minutes to 600 minutes, at a chamber temperature ranging from 10° C. to 150° C., and a chamber pressure ranging from 5 mmHg to 1520 mmHg,
wherein the treated plastic article and the plastic article comprise extractable components, wherein the extractable components comprise volatile extractives, non-volatile extractives, metal extractives and/or, leachables, and
wherein an amount of the volatile extractives from a first treated sample is reduced by at least 10%, or at least 20%, or at least 30%, or at least 35%, or at least 40%, or at least 50%, or at least 60%, or at least 70%, or at least 80% compared to an amount of the volatile extractives from a first untreated sample,
wherein an amount of the non-volatile extractives from a second treated sample is reduced by at least 10%, or at least 20%, or at least 30%, or at least 35%, or at least 40%, or at least 50%, or at least 60%, or at least 70%, or at least 80% compared to an amount of the non-volatile extractives from a second untreated sample.
wherein an amount of the metal extractives from a third treated sample is reduced by at least 10%, or at least 20%, or at least 30%, or at least 35%, or at least 40%, or at least 50%, or at least 60%, or at least 70%, or at least 80% compared to an amount of the metal extractives from a third untreated sample.

A2. The method according to embodiment A1, wherein the polyolefin comprises high-density high-molecular-weight polyethylene, high-density polyethylene (HDPE), linear-low-density polyethylene (LLDPE), low-density polyethylene (LDPE) and/or polypropylene; or wherein the polyolefin comprises high-density high-molecular-weight polyethylene, high-density polyethylene (HDPE), linear-low-density polyethylene (LLDPE), and/or low-density polyethylene (LDPE).

A3. The method according to any of embodiments A1 or A2, wherein the recycled resin comprises at least 50 wt. % polyolefin, or at least 60 wt. % polyolefin, or at least 70 wt. % polyolefin, or at least 80 wt. % polyolefin, or at least 90 wt. % polyolefin.

A4. The method according to any of embodiments A1-A3, wherein the plastic article is selected from the group consisting of bottles, caps, pails, lids, trays, drums, vials, cartridges, intermediate bulk containers (IBC), tanks, stand-up pouches (SUP) and tubes.

A5. The method according to any of embodiments A1-A4, wherein the plastic article is mono-layered.

A6. The method according to any of embodiments A1-A5, wherein the plastic article is multi-layered.

A7. The method according to any of embodiments A1-A6, wherein the time period ranges from 5 minutes to 300 minutes, the chamber temperature ranges from 10° C. to 150° C., and the chamber pressure ranges from 50 mmHg to 760 mmHg.

A8. The method according to any of embodiments A1-A7, wherein the amount of the volatile extractives from the first treated sample is reduced by at least 20%, or at least 30%, or at least 35%, or at least 40%, or at least 50%, or at least 60%, or at least 70%, or at least 80% compared to the amount of the volatile extractives from the first untreated sample as determined by 2-dimensional Headspace GC-MS after the first treated sample and the first untreated sample have been subject to desorption conditions of 80° C. for 20 minutes.

A9. The method according to any of embodiments A1-A8, wherein the extractable components comprise metal extractives, wherein the metal extractives are selected from the group consisting of copper, zinc, aluminum, and/or lead, wherein the third treated sample and the third untreated sample are analyzed according to standard, EN 71-3:2019 Soluble Heavy Metals, using inductively coupled plasma optical emission spectroscopy (ICP-OES), and wherein the amount of the metal extractives in the treated sample is reduced by at least 20 wt. %, or at least 30 wt. %, or by at least 35 wt. %, or by at least 40 wt. %, or by at least 45 wt. % compared to the amount of the metal extractives in the third untreated sample.

A10. The method according to any of embodiments A1-A9, wherein the plastic article is a plastic container, and the treated plastic article is a treated plastic container; wherein the second treated sample is one of the treated plastic container or a treated smaller analog of the plastic container, wherein the second untreated sample is one of the plastic container or a smaller analog of the plastic container; wherein a first portion of a first solvent fills at least 90 vol % of the second treated sample and a substantially equal amount of a second portion of the first solvent fills at least 90 vol % of the second untreated sample; wherein the first solvent is selected from the group consisting of water, acetic acid, hexane, heptane, octane, toluene, methanol, ethanol, and/or xylene; wherein the filled treated sample and the filled untreated sample are each closed and stored for 24 hours at 60° C., whereby the first portion of the first solvent comprises the extractable components from the second treated sample and the second portion of the first solvent comprises the extractable components from the second untreated sample; wherein the first portion of the first solvent and the second portion of the first solvent are analyzed by GC; wherein the extractable components comprise non-volatile extractives, wherein the non-volatile extractives comprise and/or are converted to n-alkane equivalents; wherein an amount of n-alkane equivalents in the first portion of the first solvent per decimeter squared of contact area between the first portion of the first solvent and the second treated sample (mg/dm$^2$) is reduced by least 20%, or at least 30%, at least 35%, or by at least 40%, compared to an amount of n-alkane equivalents in the second portion of the first solvent per decimeter squared of contact area between the second portion of the first solvent and the second untreated sample (mg/dm$^2$).

A11. The method according to embodiment A10, wherein the amount of n-alkane equivalents from the second treated sample is reduced by at least 50% or by at least 60% or by at least 70% or by at least 80% or by at least 90% compared to the amount of n-alkane equivalents from the second untreated sample.

A12. The method according to any of embodiments A1-A11, wherein the extractable components comprise terpenoids, fatty acids, fatty esters, fatty alcohols, saturated and unsaturated hydrocarbons, mineral oil hydrocarbons (MOH), benzene and functionalized derivatives, and/or oxygenated hydrocarbons such as aldehydes, ketones, and/or alcohols.

A13. The method according to any of embodiments A1-A12, wherein a second solvent consists essentially of n-hexane, wherein the second treated sample is stored in the second solvent at room temperature for 2 hours, whereby the second solvent comprises the extractable components from the second treated sample, wherein the extractable components comprise non-volatile extractives and the non-volatile extractives comprise mineral oil saturated hydrocarbons (MOSH), wherein the second solvent is analyzed for MOSH using online coupled LC-GC-FID, and wherein the second solvent comprises less than 10 mg/kg-second-treated-sample MOSH.

B1. A method of improving the quality of bottles made with recycled plastics, the method comprising the steps of:
  (a) providing a plastic bottle in a chamber; and
  (b) providing a fluorination gas in the chamber, thereby exposing the plastic bottle to the fluorination gas to produce a treated plastic bottle,
  (c) withdrawing the fluorination gas from the chamber; and
  (d) withdrawing the treated plastic bottle from the chamber,
wherein the plastic bottle comprises at least 50 wt. %, or at least 60 wt. % or at least 70 wt. % or at least 80 wt. % or at least 90 wt. % polyolefin,
wherein the plastic bottle comprises at least 10 wt. %, or at least 20%, or at least 30%, or at least 40%, or at least 50% recycled resin,
wherein step (b) occurs for a time period ranging from 5 minutes to 300 minutes, at a chamber temperature ranging from 10° C. to 150° C., and a chamber pressure ranging from 5 mmHg to 1520 mmHg, wherein the treated plastic bottle and the plastic bottle comprise extractable components, wherein the extractable components comprise volatile extractives, non-volatile extractives, metal extractives and/or, leachables, and
wherein an amount of the volatile extractives from a first treated sample is reduced by least 10%, or at least 20%, or at least 30%, at least 35%, or at least 40%, or at least 50%, or at least 60%, or at least 70%, or at least 80% compared to an amount the volatile extractives from a first untreated sample,
wherein an amount of the non-volatile extractives from a second treated sample is reduced by at least 10%, or at least 20%, or at least 30%, or at least 35%, or at least 40%, or at least 50%, or at least 60%, or at least 70%, or at least 80% compared to an amount of the non-volatile extractives from a second untreated sample, and
wherein an amount of the metal extractives from a third treated sample is reduced by at least 10%, or at least 20%, or at least 30%, or at least 35%, or at least 40%, or at least 50%, or at least 60%, or at least 70%, or at least 80% compared to an amount of the metal extractives from a third untreated sample.

B2. The method according to embodiment B1, wherein the polyolefin comprises high-density polyethylene (HDPE), linear-low-density polyethylene (LLDPE), low-density polyethylene (LDPE), and/or polypropylene, and wherein the recycled resin comprises at least 50 wt. %, or at least 60 wt. %, or at least 70 wt. %, or at least 80 wt. % polyolefin.

B3. The method according to any of embodiments B1 or B2, wherein the plastic bottle is mono-layered.

B4. The method according to any of embodiments B1-B3, wherein the plastic bottle is multi-layered.

B5. The method according to any of embodiments B1-B4, wherein the second treated sample is one of the treated bottle or a treated smaller analog of the plastic bottle and the second untreated sample is one of the bottle or a smaller analog of the plastic bottle, wherein a first portion of a third solvent fills at least 90 vol % of the second treated sample and a substantially equal amount of a second portion of the third solvent fills at least 90 vol % of the second untreated sample; wherein the third solvent is selected from the group consisting of water, acetic acid, hexane, heptane, octane, toluene, methanol, ethanol, and/or xylene; wherein the filled untreated sample and the filled treated sample are each closed and stored for 24 hours at 60° C., whereby the first portion of the third solvent comprises the extractable components from the second treated sample and the second portion of the third solvent comprises the extractable components from the second untreated sample; wherein the first portion of the third solvent and the second portion of the third solvent are analyzed by GC; wherein the extractable components comprise non-volatile extractives, wherein the non-volatile extractives comprise and/or are converted to n-alkane equivalents; wherein an amount of n-alkane equivalents in the first portion of the third solvent per decimeter squared of contact area between the first portion of the third solvent and the second treated sample (mg/dm$^2$) is reduced by at least 20%, by at least 30%, by at least 35%, or by at least 40%, or by at least 50%, or by at least 60%, or by at least 70%, or by at least 80%, or by at least 90% compared to an amount of n-alkane equivalents in the second portion of the third solvent per decimeter squared of contact area between the second portion of the third solvent and the third untreated sample (mg/dm$^2$).

B6. The method according to any of embodiments B1-B5, wherein a fourth solvent consists essentially of n-hexane, wherein the second treated sample is a treated plastic bottle or a treated smaller analog of the plastic bottle, wherein the fourth solvent fills at least 90% of the second treated sample at room temperature for 2 hours whereby the fourth solvent comprises the extractable components from the second treated sample, wherein the extractable components comprise non-volatile extractives and the non-volatile extractives comprise mineral oil saturated hydrocarbons (MOSH), and wherein the fourth solvent is analyzed for mineral oil saturated hydrocarbons (MOSH) using online coupled LC-GC-FID, wherein the wherein the fourth solvent comprises less than 1 mg/kg-second-treated-sample MOSH.

B7. The method according to any of embodiments B1-B6, wherein the first treated sample is a treated plastic bottle or a treated smaller analog of the plastic bottle, and a first untreated sample is a plastic bottle or a smaller analog of the plastic bottle, wherein the amount of the volatile extractives from a first treated sample is reduced by at least 35%, or at least 40%, or at least 50%, or at least 60%, or at least 70%, or at least 80% compared to the amount of the volatile extractives from a first untreated sample as determined by 2-dimensional Headspace GC-MS after the first treated sample and the first untreated sample have been subject to desorption conditions of 80° C. for 20 minutes.

B7. The method according to any of embodiments B1-B6, wherein the extractable components comprise metal extractives, wherein the metal extractives are selected from the group consisting of copper, zinc, aluminum, and/or lead, wherein the treated sample and the untreated sample analyzed according to standard, EN 71-3:2019 Soluble Heavy Metals, using inductively coupled plasma optical emission spectroscopy (ICP-OES), and wherein a total amount of the metal extractives in the treated sample is reduced by at least 20 wt. %, or at least 30 wt. %, or by at least 35 wt. %, or by at least 40 wt. % or by at least 45 wt. % compared to a total amount of the metal extractives in the untreated sample C1. A treated plastic bottle made from any of the embodiments A1.-A13. Or B1.-B7.

C2. The treated plastic bottle made according to C1, wherein the treated plastic bottle is recyclable.

EXAMPLES

Test Methods

1-Dimensional Headspace GC-MS 1 g of a sample (pellets or bottle chips) was weighed into a 20 mL headspace vial with a glass coated magnetic stir bar and sealed with a magnetic crimp cap with a PTFE lined septum. Enrichment of analytes was done for 1 hour at 110° C. using a DVB/CAR/PDMS fiber. Desorption was done at 250° C. directly into the GC instrument. The representative GC settings were as follows: Carrier gas argon, column oven temp was the following: 2 minutes isothermal at 50° C., heat up to 200° C. at 12° C./min, then hold isothermal at 200° C. for 4 min. Qualitative analysis of chemical species was performed. Calculated peak areas of any given species in a sample was considered to be proportional to absolute quantities of respective volatile species.

2-Dimensional Headspace GC-MS 500 mg of a sample (pellets or bottle chips) was weighed into a 20 mL headspace vial with a glass coated magnetic stir bar and sealed with a magnetic crimp cap with a PTFE lined septum. Enrichment of the analytes was done on a 2 cm stable flex 50/30 μm DVB/Carboxen/PDMS SPME fiber for 20 minutes at 80° C. Desorption was done directly in the hot injection port of the GCxGC-MS system using a SPME liner at 270° C. GCxGC-MS parameters were the following Column 1: 30 m RestekRxi1MS 0.25*0.25

Column 2: 2 m Restek Rtx 200 0.15*0.15

Modulation frequency: 5 s, hot jet pulse 350 ms (200° C., after 25 raised to 285° C.)

MS Parameter: full scan 35-300 amu, 50 scans/s

Carrier gas was Helium, flow control mode was linear velocity, pressure was 85 kPa, total flow of 7.2 mL/min, column flow of 1.04 mL/min, linear velocity of 30 cm/s, and purge flow of 3 mL/min. Injection mode was split with ratio 3:1 and injection temperature was 26° C., column oven temp was the following: 2 minutes isothermal at 35° C., heat up to 200° C. at 4 C/min, then heat up to 280° C. at 20° C./min, hold isothermal at 280° C. for 3 min. Qualitative analysis of chemical species was performed. Calculated peak areas of any given species in a sample was considered to be proportional to absolute quantities of respective volatile species.

Gravimetric Extractables Using n-Hexane 20 grams of each sample (pellets or bottle chips) were rinsed in flowing water for 1 minute and allowed to dry. A clean, dry glass jar was weighed. Dried pellets were soaked in 60 mL of n-hexane for 24 hours at 60° C. in the weighed clean glass jar. Jar was covered with aluminum foil and then fastened with a screw cap to prevent n-hexane from evaporating. At the end of soak duration, pellets are taken out of n-hexane in the glass jar. N-hexane was allowed to evaporate at room temperature in a fume hood with a lid partially covering the beaker. After n-hexane was evaporated, the glass jar was weighed again. The gain in weight of the glass jar (before vs after soak) is reported as extractables.

Soluble Heavy Metal Extractables

Soluble heavy metal extractables were tested according to standard EN 71:EN 71 Part 3-(19) Soluble Heavy Metals.

Migration Methodology

A mix of internal standards (deuterated compounds n-alkanes and phthalates) was added was added to the 50 mL of the solvent, octane, that was stored in a closed bottle for 24 hour in an oven at 60° C. The solvent was reduced to a defined volume of 2 mL. Aliquots of 1 µL were injected in a GC system with a non polar column (7.5 m MN delta 6 0.1*0.1). Total migration was calculated by comparison of a series of linear n-alkanes (up to C37). The amount of n-alkane equivalents were divided by the contact area between the solvent and the bottle. Results are expressed as n-alkane equivalent in mg/dm$^2$. All samples were extracted and analyzed in duplicate and the average value was reported.

Non-Volatile Extractives 100 mg of each sample (bottle chips) was weighed into glass vials, internal standard and 2 mL of n-hexane were added. The samples were extracted for 2 h at room temperature. An aliquot was used for the analysis of mineral oil saturated hydrocarbons (MOSH) and mineral oil aromatic hydrocarbons (MOAH) using an online coupled LC-GC-FID afterwards. The results are reported according to the JRC-guideline in fractions from C10-C50. The total amount was calculated from the JRC fractions using the lower bound attempt (results less than LOD equals zero). The LOD was 10 mg/kg-sample.

Two different recycled polyolefin resins in the form of pellets were obtained from KW Plastics (Troy, Alabama); KWR102 HDPE-mixed color and KWR101-150 Natural HDPE. A virgin polyolefin, MARLEX HHM 5503BN polyethylene was obtained from Chevron Phillips Chemical (The Woodlands, Texas).

Comparative Example 1

Untreated KWR102 HDPE mixed color pellets (i.e., pellets that were not subject to the inventive process) were subject to analytical testing in order to quantify the improvement of a non-limiting embodiment of the present invention. KWR102 HDPE pellets were analyzed using the 1-dimensional headspace GC-MS test method described above. Qualitative analysis of chemical species was performed. Results of the 1-dimensional headspace GC-MS are given in Table 1.

Untreated KWR102 HDPE pellets were also analyzed using the 2-dimensional headspace GC-MS test method describe above. Results of the 2-dimensional headspace GC-MS are given in Table 2.

Untreated KWR102 HDPE pellets were also analyzed using the gravimetric extractables using n-Hexane test procedure. Results are given in Table 3.

Example 1

20 grams of KWR102 HDPE pellets were inserted into a chamber. The chamber was heated using annular flow of hot water to achieve a nominal chamber temperature of 60° C. Atmospheric air was removed from the chamber using a nitrogen pressure swing inerting method. The pressure in the chamber was increased to 300 mm Hg with a gas comprising of 20 vol % fluorine and 80% nitrogen. The pressure was maintained constant in the chamber for 30 minutes. At the end of 30 minutes, the chamber was filled and evacuated three times using atmospheric air. Atmospheric air was fed through the chamber until the chamber pressure was restored to atmospheric pressure. The pellets removed from the chamber are designated treated KWR102 HDPE pellets.

The treated KWR102 HDPE pellets were analyzed using the 1-dimensional headspace GC-MS test method described above. Results of the 1-dimensional headspace GC-MS are given in Table 1. Table 1 also shows the % Peak Area reduction for representative chemicals.

The treated KWR102 HDPE pellets were also analyzed using the 2-dimensional headspace GC-MS test method described above. Results of the 2-dimensional headspace GC-MS are given in Table 2. Table 2 also shows the % Peak area reduction for representative chemicals.

Treated KWR102 HDPE pellets were analyzed following the gravimetric extractables using n-Hexane test method. Results are given in Table 3.

TABLE 1

1-dimensional headspace GC-MS for untreated and treated KWR102 HDPE pellets

| | Peak area (instrument units) | | |
|---|---|---|---|
| Molecule | Comp. Ex. 1 Untreated pellet | Ex. 1 Treated pellet | % Peak area reduction |
| Limonene | $6.82 \times 10^8$ | $2.80 \times 10^8$ | 59 |
| Beta pinene | $2.48 \times 10^7$ | ND | non-determinate (approaching a high %) |
| Acetic acid hexyl ester | $4.59 \times 10^7$ | $2.62 \times 10^7$ | 43 |
| 1-dodecene | $1.73 \times 10^7$ | ND | non-determinate (approaching a high %) |

TABLE 2

2-dimensional headspace GC-MS for untreated and treated KWR102 HDPE pellets

| | Peak area (instrument units) | | |
|---|---|---|---|
| Molecule | Comp. Ex. 1 Untreated pellet | Ex. 1 Treated pellet | % Peak area reduction |
| Eucalyptol | $2.26 \times 10^7$ | $1.16 \times 10^7$ | 49 |
| L-alpha-Terpineol | $8.89 \times 10^7$ | $4.40 \times 10^7$ | 50 |
| Octanal | $2.05 \times 10^7$ | $1.09 \times 10^7$ | 47 |
| Nonanal | $5.56 \times 10^7$ | $1.90 \times 10^7$ | 66 |
| Decanal | $8.06 \times 10^7$ | $4.06 \times 10^7$ | 50 |
| Acetic acid hexyl ester | $8.12 \times 10^7$ | $6.01 \times 10^7$ | 26 |
| Acetic acid phenylmethyl ester | $1.06 \times 10^8$ | $8.44 \times 10^7$ | 21 |

TABLE 2-continued 2-dimensional headspace GC-MS for untreated and treated KWR102 HDPE pellets Peak area (instrument units)

| Molecule | Comp. Ex. 1 Untreated pellet | Ex. 1 Treated pellet | % Peak area reduction |
|---|---|---|---|
| Heptanoate | $5.45 \times 10^7$ | $2.03 \times 10^7$ | 63 |
| Benzene, 1-ethyl-3,5-dimethyl- | $1.47 \times 10^7$ | $7.22 \times 10^6$ | 51 |
| Naphthalene | $5.06 \times 10^7$ | $1.87 \times 10^7$ | 63 |
| Benzyl alcohol | $5.27 \times 10^7$ | $3.64 \times 10^7$ | 31 |

TABLE 3

Soluble Heavy Metal Extractables

| | Soluble heavy metal extractables (ppm) | | % reduction |
|---|---|---|---|
| Metal | Comp. Ex. 1 Untreated pellet | Ex. 1 Treated pellet | heavy metal extractable |
| Copper | 5.62 | <1 | >82 |
| Zinc | 1.48 | 1.37 | 7 |
| Aluminum | 6.11 | 3.76 | 39 |
| Lead | 1.28 | <1 | >22 |
| All metals | 14.49 | <7.13 | >49% | chamber instead of the KWR102 HDPE pellets. The pellets removed from the chamber are designated treated KWR101-150 Natural HDPE pellets. The treated KWR101-150 pellets were analyzed following the gravimetric extractables using n-Hexane test method. Results are given in Table 4.

TABLE 4

Gravimetric Extractables using n-Hexane

| | | Extractables (grams) | | |
|---|---|---|---|---|
| Examples | Resin | Untreated pellet | treated pellet | % Reduction extractables |
| Comp Ex 1/Ex 1 | KWR102 | 0.119 | 0.077 | 35 |
| Comp Ex 2/Ex 2 | KWR101-150 | 0.053 | 0.041 | 23 |

Preparation of Bottles

Based on the positive results from the pellet testing, further work was pursued on testing bottles made from recycled polyolefins. All bottles were produced from untreated pellets. All bottles were produced on a WMB4-100/16t BA 15317 blow molding machine with a multi-layered head, S 1/90 P-PE Coex7-8-BA 15555, manufactured by W. Mueller. The chiller temperature was 52° F., the main air pressure was 120 psi, the blow time was 18 sec with a cycle time of 23 sec. Straight parisons were made and the head temperature was 365 F. Details on the extrusion setting are given in Table 5.

TABLE 5

Extrusion Conditions for Bottle Making

| Bottle | Description | Extruder size | Resin | Wt. % | Zone 1 (° F.) | Zone 2 (° F.) | Zone 3 (° F.) | Zone 4 (° F.) |
|---|---|---|---|---|---|---|---|---|
| A | Mono-layer | 50/25D | KWR101-150 | 100 | 380 | 380 | 390 | 390 |
| B | Mono-layer | 50/25D | KWR102 | 100 | 380 | 380 | 390 | 390 |
| C | Multi-layer | 30/25D | MARLEX 5502BN | 20 | 355 | 360 | 370 | 375 |
| | | 50/25D | KWR101-150 | 60 | 380 | 380 | 390 | 390 |
| | | 30/25D | MARLEX 5502BN | 20 | 355 | 360 | 370 | 375 |
| D | Multi-layer | 30/25D | MARLEX 5502BN | 20 | 355 | 360 | 370 | 375 |
| | | 50/25D | KWR102 | 60 | 380 | 380 | 390 | 390 |
| | | 30/25D | MARLEX 5502BN | 20 | 355 | 360 | 370 | 375 |
| E | Multi-layer | 30/25D | MARLEX 5502BN | 5 | 355 | 360 | 370 | 375 |
| | | 50/25D | KWR101-150 | 90 | 380 | 380 | 390 | 390 |
| | | 30/25D | MARLEX 5502BN | 5 | 355 | 360 | 370 | 375 |
| F | Multi-layer | 30/25D | MARLEX 5502BN | 5 | 355 | 360 | 370 | 375 |
| | | 50/25D | KWR102 | 90 | 380 | 380 | 390 | 390 |
| | | 30/25D | MARLEX 5502BN | 5 | 355 | 360 | 370 | 375 |

Comparative Example 2

Untreated KWR101-150 Natural HDPE pellets (i.e., pellets that were not subject to the inventive process) were analyzed following the gravimetric extractables using n-Hexane test method. Results are given in Table 3.

Example 2

Example 1 was repeated except for 20 grams of KWR101-150 Natural HDPE pellets were inserted into a Comparative Example 3

A bottle A, a mono-layer bottle made from 10000 KWR101-150 Natural HDPE pellets, with no further treatment, was cut into small pieces, Bottle A chips of 20 mg each, for analysis. The untreated Bottle A chips were analyzed for volatile extractives using the 2-dimensional headspace GC-MS test method described above. Results of the 2-dimensional headspace GC-MS are given in Table 6. The untreated Bottle A chips were also analyzed following the Non-Volatile Extractives test method. Results are given in Table 8, the sample had no detectable amount of MOAH.

Example 3

A Bottle A (mono-layer bottle made from 100% KWR101-150 Natural HDPE pellets) with no further treatment was cut into small pieces, Bottle A chips of 20 mg each, for analysis. Example 1 was repeated except that the Bottle A chips were inserted into a chamber instead of the pellets. The treated Bottle A chips were analyzed for volatile extractives using the 2-dimensional headspace GC-MS test method describe above. Results of the 2-dimensional headspace GC-MS are given in Table 6. The treated Bottle A chips were also analyzed following the Non-Volatile Extractives test method. Results are given in Table 8, the sample had no detectable amount of MOAH.

These volatile extractives (2D GCMS) and non-volatile extractives tests for comparing Comparative Example 3 with Example 3 (and Comparative Example 4 with Example 4 below) were conducted on bottle chips because the analysis could be readily performed on standard analytical equipment. If a treated bottle had been cut into chips, significant surface area that had not been treated with an embodiment of the inventive process would be present and render the comparison invalid. Therefore, the bottle chips were subject to an embodiment of the present invention and compared with bottle chips that were not.

Comparative Example 4

A bottle B, a mono-layer bottle made from 100% KWR102 HDPE pellets, with no further treatment, was cut into small pieces, bottle chips of 20 mg each, for analysis. The untreated bottle B chips were analyzed using the 2-dimensional headspace GC-MS test method described above. Results of the 2-dimensional headspace GC-MS are given in Table 7. The untreated Bottle B chips were also analyzed following the Non-Volatile Extractives test method. Results are given in Table 8, the sample had no detectable amount of MOAH.

Example 4

A Bottle B (mono-layer bottle made from 100% KWR102 HDPE pellets) with no further treatment was cut into small pieces, Bottle B chips of 20 mg each, for analysis. Example 1 was repeated except that the Bottle B chips were inserted into a chamber instead of pellets. The treated Bottle B chips were analyzed for volatile extractives using the 2-dimensional headspace GC-MS test method describe above. Results of the 2-dimensional headspace GC-MS are given in Table 7. The treated Bottle B chips were also analyzed following the Non-Volatile Extractives test method. Results are given in Table 8, the sample had no detectable amount of MOAH.

TABLE 6

2-dimensional headspace GC-MS for untreated and treated Bottle A - made from 100% KWR101- 150 HDPE pellets

| | Peak area (instrument units) | | |
| --- | --- | --- | --- |
| Molecule | Comp. Ex. 3 Untreated bottle A chips | Ex. 3 Treated bottle A chips | % Peak area reduction |
| Eucalyptol | $2.20 \times 10^7$ | $7.47 \times 10^6$ | 66 |
| L-alpha-Terpineol | $3.35 \times 10^7$ | $5.80 \times 10^6$ | 83 |
| Octanal | $1.55 \times 10^7$ | $3.08 \times 10^6$ | 80 |
| Nonanal | $1.04 \times 10^8$ | $1.06 \times 10^7$ | 90 |
| Decanal | $3.71 \times 10^7$ | $5.37 \times 10^6$ | 86 |
| Acetic acid hexyl ester | $1.06 \times 10^7$ | $3.09 \times 10^6$ | 70 |
| Acetic acid phenylmethyl ester | $1.28 \times 10^7$ | $3.88 \times 10^6$ | 70 |
| Heptanoate | $1.32 \times 10^7$ | $1.55 \times 10^6$ | 88 |
| Benzene, 1-ethyl-3,5-dimethyl- | $7.72 \times 10^6$ | $1.34 \times 10^6$ | 82 |
| Naphthalene | $1.59 \times 10^7$ | $3.08 \times 10^6$ | 80 |
| Benzyl alcohol | $1.92 \times 10^7$ | $2.24 \times 10^6$ | 88 |

TABLE 7

2-dimensional headspace GC-MS for untreated and treated Bottle B - made from 100% KWR102 HDPE pellets

| | Peak area (instrument units) | | |
| --- | --- | --- | --- |
| Molecule | Comp. Ex. 4 Untreated bottle B chips | Ex. 4 Treated bottle B chips | % Peak area reduction |
| Eucalyptol | $3.97 \times 10^7$ | $2.12 \times 10^7$ | 46 |
| L-alpha-Terpineol | $8.40 \times 10^7$ | $4.48 \times 10^7$ | 45 |
| Octanal | $2.86 \times 10^7$ | $1.53 \times 10^7$ | 47 |
| Nonanal | $5.77 \times 10^7$ | $2.71 \times 10^7$ | 53 |
| Decanal | $8.78 \times 10^7$ | $3.92 \times 10^7$ | 55 |
| Acetic acid hexyl ester | $8.21 \times 10^7$ | $7.46 \times 10^7$ | 9 |
| Acetic acid phenylmethyl ester | $9.01 \times 10^8$ | $6.44 \times 10^7$ | 28 |
| Heptanoate | $5.40 \times 10^7$ | $2.79 \times 10^7$ | 48 |
| Benzene, 1-ethyl-3,5-dimethyl- | $2.50 \times 10^7$ | $1.61 \times 10^7$ | 35 |
| Naphthalene | $6.19 \times 10^7$ | $2.55 \times 10^7$ | 68 |
| Benzyl alcohol | $8.72 \times 10^7$ | $3.94 \times 10^7$ | 55 |

TABLE 8

MOSH measurements (ppm), by molecular weight measured in number of carbons

| Example | Bottle | C10-C16 | C16-C20 | C20-C25 | C26-C35 | C36-C40 | C41-C50 |
| --- | --- | --- | --- | --- | --- | --- | --- |
| Comp Ex. 3 | A | ND | ND | ND | 11 | ND | ND |
| Ex. 3 | A | ND | ND | ND | ND | ND | ND |
| Comp Ex. 4 | B | 31 | 27 | 59 | 66 | ND | ND |
| Ex 4 | B | ND | ND | ND | ND | ND | ND |

Comparative Example 5

50 ml of octane was placed in each of two untreated Bottles A. The Bottles A were each closed with a screw cap and stored in an oven at 60° C. for 24 hours. Afterward, the solvent was removed from each bottle and analyzed for non-volatile extractives according to the Migration Methodology test method. Results, the average of the two sample numbers, are shown in Table 9.

Example 5

Example 1 was repeated except that several ones of Bottle A (mono-layer bottle made from 100% KWR101-150 Natural HDPE pellets) were inserted into a chamber instead of the pellets. 50 ml of octane was placed in each of two treated Bottles A. The bottles A were each closed with a screw cap and stored in an oven at 60° C. for 24 hours. Afterward, the solvent was removed from each bottle and analyzed for non-volatile extractives according to the Migration Methodology test method. Results, the average of the two sample numbers, are shown in Table 9.

Example 6

Example 1 was repeated except that several ones of Bottle B (mono-layer bottle made from 100% KWR102 HDPE pellets) were inserted into a chamber instead of the pellets. 50 ml of octane was placed in each of two treated Bottles B. The bottles B were each closed with a screw cap and stored in an oven at 60° C. for 24 hours. Afterward, the solvent was removed from each bottle and analyzed for non-volatile extractives according to the Migration Methodology test method. Results, the average of the two sample numbers, are shown in Table 9.

Comparative Examples 6-10

Comparative Example 5 was repeated using two untreated Bottles B, and with two each of the other untreated bottles C-F. Bottles C-F represent an alternative approach to using recycled resin in bottles and other containers. In Bottles C-F, the recycle resin is sandwiched between virgin resin on the inside and the outside. The purpose of the virgin resin is to provide a barrier to the extractable components found in the recycled resin. The results are shown in Table 9.

Treating Bottle A with an embodiment of the inventive process reduced the non-volatile extractives by 95% [(1-.23/4.62)*100] compared to the untreated Bottle A. Also, comparing Treated Bottle A with the multilayer bottles also made with KWR101-150 Natural HDPE pellets, bottles C and E, treated Bottle A has a 92% and a 93% reduction in non-volatile extractives, respectively.

Treating Bottle B with an embodiment of the inventive process reduced the non-volatile extractives by 9200 compared to the untreated Bottle B. Also, comparing treated Bottle B with the multilayer bottles also made with KWR102HDPE pellets, bottles D and F, treated Bottle B shows an 87% and a 90% reduction in non-volatile extractives, respectively.

TABLE 9

Migration results in Octane

| Example | Bottle | Total migration (mg/dm2) |
|---|---|---|
| Comp Ex. 5 | A | 4.62 |
| Ex. 5 | A | 0.23 |
| Comp Ex. 6 | B | 11.22 |
| Ex. 6 | B | 0.88 |
| Comp. Ex. 7 | C | 2.97 |
| Comp. Ex. 8 | D | 6.96 |
| Comp. Ex. 9 | E | 3.28 |
| Comp. Ex. 10 | F | 8.77 |

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method of improving the quality of products made with recycled plastics, the method comprising the steps of:
   (a) providing a plastic article in a chamber; and
   (b) providing a fluorination gas in the chamber, thereby exposing the plastic article to the fluorination gas to produce a treated plastic article;
   (c) withdrawing the fluorination gas from the chamber; and
   (d) withdrawing the treated plastic article from the chamber,
   wherein the plastic article comprises at least 50 wt. % polyolefin,
   wherein the plastic article comprises at least 10 wt. % recycled resin,
   wherein step (b) occurs for a time period ranging from 5 minutes to 600 minutes, at a chamber temperature ranging from 10° C. to 150° C., and at a chamber pressure ranging from 5 mmHg to 1520 mmHg,
   wherein the treated plastic article and the plastic article comprise extractable components,
   wherein the extractable components comprise volatile extractives, non-volatile extractives, metal extractives and/or, leachables,
   wherein an amount of the volatile extractives from a first treated sample is reduced by at least 10% compared to an amount of the volatile extractives from a first untreated sample;
   wherein an amount of the non-volatile extractives from a second treated sample is reduced by at least 10% compared to an amount of the non-volatile extractives from a second untreated sample; and
   wherein an amount of the metal extractives from a third treated sample is reduced by at least 10% compared to an amount of the metal extractives from a third untreated sample.

2. The method of claim 1, wherein the polyolefin comprises high-density high-molecular-weight polyethylene, high-density polyethylene (HDPE), linear-low-density polyethylene (LLDPE), low-density polyethylene (LDPE) and/or polypropylene.

3. The method of claim 1, wherein the recycled resin comprises at least 50 wt. % polyolefin.

4. The method of claim 1, wherein the plastic article is selected from the group consisting of bottles, caps, pails, lids, trays, drums, vials, cartridges, intermediate bulk containers (IBC), tanks, stand-up pouches (SUP) and tubes.

5. The method of claim 1, wherein the plastic article is mono-layered.

6. The method of claim 1, wherein the plastic article is multi-layered.

7. The method of claim 1, wherein the time period ranges from 5 minutes to 300 minutes, the chamber temperature ranges from 10° C. to 150° C., and the chamber pressure ranges from 50 mmHg to 760 mmHg.

8. The method of claim 1, wherein the extractable components comprise volatile extractives, and
wherein the amount of the volatile extractives from the first treated sample is reduced by at least 35% compared to an amount of the volatile extractives from the first untreated sample as determined by 2-dimensional Headspace GC-MS after the treated sample and the untreated sample have been subject to desorption conditions of 80° C. for 20 minutes.

9. The method of claim 1, wherein the extractable components comprise metal extractives, wherein the metal extractives are selected from the group consisting of copper, zinc, aluminum, and/or lead,
wherein the third treated sample and the third untreated sample are analyzed according to standard, EN 71-3: 2019 Soluble Heavy Metals, using inductively coupled plasma optical emission spectroscopy (ICP-OES) and wherein the amount of the metal extractives from the treated sample is reduced by at least 35 wt. % compared to the amount of the metal extractives from the third untreated sample.

10. The method of claim 1, wherein the plastic article is a plastic container, and the treated plastic article is a treated plastic container;
wherein the second treated sample is one of the treated plastic container or a treated smaller analog of the plastic container,
wherein the second untreated sample is one of the plastic container or a smaller analog of the plastic container,
wherein a first portion of a solvent fills at least 90 vol % of the second treated sample and a substantially equal amount of a second portion of the solvent fills at least 90 vol % of the second untreated sample;
wherein the solvent is selected from the group consisting of water, acetic acid, hexane, heptane, octane, toluene, methanol, ethanol, and/or xylene;
wherein the filled second treated sample and the filled a second treated sample are each closed and stored for 24 hours at 60° C., whereby the first portion of the solvent comprises the extractable components from the second treated sample and the second portion of the solvent comprises the extractable components from the second untreated sample;
wherein the first portion of the solvent and the second portion of the solvent are analyzed by GC;
wherein the extractable components comprise non-volatile extractives,
wherein the non-volatile extractives comprise and/or are converted to n-alkane equivalents;
wherein an amount of n-alkane equivalents in the first portion of the solvent per decimeter squared of contact area between the first portion of the solvent and the second treated sample ($mg/dm^2$) is reduced by at least 35% compared to an amount of the n-alkane equivalents in the second portion of the solvent per decimeter squared of contact area between the second portion of the solvent and the second untreated sample ($mg/dm^2$).

11. The method of claim 10, wherein the amount of n-alkane equivalents from the treated sample is reduced by at least 50% compared to the amount of n-alkane equivalents from the untreated sample.

12. The method of claim 1, wherein the extractable components comprise terpenoids, fatty acids, fatty esters, fatty alcohols, saturated and unsaturated hydrocarbons, mineral oil hydrocarbons (MOH), benzene and functionalized derivatives, and/or oxygenated hydrocarbons such as aldehydes, ketones, and/or alcohols.

13. The method of claim 1,
wherein a solvent consists essentially of n-hexane,
wherein the second treated sample is stored in the solvent at room temperature for 2 hours,
whereby the solvent comprises the extractable components from the treated sample,
wherein the extractable components comprise non-volatile extractives and the non-volatile extractives comprise mineral oil saturated hydrocarbons (MOSH),
wherein the solvent is analyzed for MOSH using online coupled LC-GC-FID, and
wherein the solvent comprises less than 10 mg/kg MOSH.

14. A method of improving the quality of bottles made with recycled plastics, the method comprising the steps of:
(a) providing a plastic bottle in a chamber; and
(b) providing a fluorination gas in the chamber, thereby exposing the plastic bottle to the fluorination gas to produce a treated plastic bottle,
(c) withdrawing the fluorination gas from the chamber; and
(d) withdrawing the treated plastic bottle from the chamber,
wherein the plastic bottle comprises at least 50 wt. % polyolefin,
wherein the plastic bottle comprises at least 10 wt. % recycled resin,
wherein step (b) occurs for a time period ranging from 5 minutes to 300 minutes, at a chamber temperature ranging from 10° C. to 150° C., and a chamber pressure ranging from 5 mmHg to 1520 mmHg,
wherein the treated plastic bottle and the plastic bottle comprise extractable components,
wherein the extractable components comprise volatile extractives, non-volatile extractives, metal extractives and/or, leachables, and
wherein an amount of the volatile extractives from a first treated sample is reduced by at least 10% compared to an amount of the volatile extractives from a first untreated sample;
wherein an amount of the non-volatile extractives from a second treated sample is reduced by at least 10% compared to an amount of the non-volatile extractives from a second untreated sample; and
wherein an amount of the metal extractives from a third treated sample is reduced by at least 10% compared to an amount of the metal extractives from a third untreated sample.

15. The method of claim 14, wherein the polyolefin comprises high-density polyethylene (HDPE), linear-low-density polyethylene (LLDPE), and/or low-density polyethylene (LDPE), and/or polypropylene, and wherein the recycled resin comprises at least 50 wt. % polyolefin.

16. The method of claim 14, wherein the plastic bottle is mono-layered.

17. The method of claim 14, wherein the plastic bottle is multi-layered.

18. The method of claim 14, wherein the second treated sample is one of the treated bottle and the second untreated sample is one of the bottle,
  wherein a first portion of a solvent fills at least 90 vol % of the second treated sample and a substantially equal amount of a second portion of the solvent fills at least 90 vol % of the second untreated sample;
  wherein the solvent is selected from the group consisting of water, acetic acid, hexane, heptane, octane, toluene, methanol, ethanol, and/or xylene;
  wherein the filled second untreated sample and the filled second treated sample are each closed and stored for 24 hours at 60° C., whereby the first portion of the solvent comprises the extractable components from the second treated sample and the second portion of the solvent comprises the extractable components from the second untreated sample;
  wherein the first portion of the solvent and the second portion of the solvent are analyzed by GC;
  wherein the extractable components comprise non-volatile extractives,
  wherein the non-volatile extractives comprise and/or are converted to n-alkane equivalents;
  wherein an amount of n-alkane equivalents in the first portion of the solvent per decimeter squared of contact area between the first portion of the solvent and the treated sample (mg/dm$^2$) is reduced by at least 35% compared to an amount of n-alkane equivalents in the second portion of the solvent per decimeter squared of contact area between the second portion of the solvent and the untreated sample (mg/dm$^2$).

19. The method of claim 14, wherein the second treated sample consists of the treated plastic bottle or a treated smaller analog of the plastic bottle,
  wherein a solvent consists essentially of n-hexane,
  wherein the solvent fills at least 90% of the second treated sample at room temperature for 2 hours, whereby the solvent comprises the extractable components from the treated sample,
  wherein the extractable components comprise non-volatile extractives and the non-volatile extractives comprise mineral oil saturated hydrocarbons (MOSH), and
  wherein the solvent is then analyzed for MOSH using online coupled LC-GC-FID,
  wherein the solvent comprises less than 10 mg/kg MOSH.

20. A treated plastic bottle made from the method of claim 14, wherein the treated plastic bottle is recyclable.

* * * * *